United States Patent [19]

Martin

[11] Patent Number: 5,444,029
[45] Date of Patent: Aug. 22, 1995

[54] PROCESS FOR DESTROYING SUSPENDED PARTICLES

[75] Inventor: Guy Martin, Magnac sur Touvre, France

[73] Assignee: Omia, Saint-Yrieix-sur-Charente, France

[21] Appl. No.: 351,139

[22] Filed: Nov. 30, 1994

Related U.S. Application Data

[63] Continuation of Ser. No. 103,707, Aug. 10, 1993, abandoned.

[51] Int. Cl.$^6$ .................... B01J 20/34; B01D 53/74
[52] U.S. Cl. .......................... 502/38; 502/56; 502/514; 423/210; 423/215.5; 55/267; 55/DIG. 46; 95/141; 95/148; 95/279; 588/205; 588/228; 34/472; 34/473; 34/478
[58] Field of Search .............. 423/210, 245.3, 215.5; 588/226, 228, 205; 95/141, 148, 279; 96/144; 502/514, 56, 38; 34/472, 473, 478; 55/DIG. 46, 267

[56] References Cited

U.S. PATENT DOCUMENTS

| 4,565,553 | 1/1986 | Nowack | 55/59 |
| 4,689,054 | 8/1987 | Vara et al. | 55/61 |
| 5,262,131 | 11/1993 | Bayer et al. | 422/175 |
| 5,300,468 | 4/1994 | Senun et al. | 502/34 |

FOREIGN PATENT DOCUMENTS

| 0023054 | 1/1981 | European Pat. Off. | 95/141 |
| 0211768 | 2/1987 | European Pat. Off. | |
| 2847714 | 5/1980 | Germany . | |
| 3438156 | 4/1986 | Germany | 502/56 |
| 50-77296 | 6/1975 | Japan | 95/148 |
| 59-36521 | 2/1984 | Japan | 95/148 |
| 62-33520 | 2/1987 | Japan | 502/38 |
| 1221549 | 2/1971 | United Kingdom . | |
| 889085 | 12/1981 | U.S.S.R. | 423/245.3 |
| 91/06361 | 5/1991 | WIPO . | |

Primary Examiner—Gary P. Straub
Assistant Examiner—Timothy C. Vanoy
Attorney, Agent, or Firm—Pollock, Vande Sande & Priddy

[57] ABSTRACT

A method for regenerating an activated charcoal filter for a spray paint booth exhaust which includes the following steps:
a passing a first gas flow of uncontaminated inlet air through the filter;
preheating the first gas flow;
combining the preheated first gas flow with additional uncontaminated air to form a preheated second gas flow at a predetermined temperature for achieving substantially complete desorption of the activated charcoal filter;
recirculating the preheated second gas flow through the filter for desorbing filtered contaminants into the second gas flow;
conveying the second gas flow to a heat contributing heat exchanging point for further preheating;
pyrolytically oxidizing the further reheated gas flow, at a preselected elevated temperature, thereby oxidizing substantially all of the suspended particles therein;
passing a resulting oxidized flow, at elevated temperature, to the heat exchanging point for cooling the oxidized gas flow and contributing exchanged heat to the second gas flow to achieve upstream further preheating; and
discharging the cooled flow, devoid of noxious particles, to the atmosphere.

5 Claims, 1 Drawing Sheet

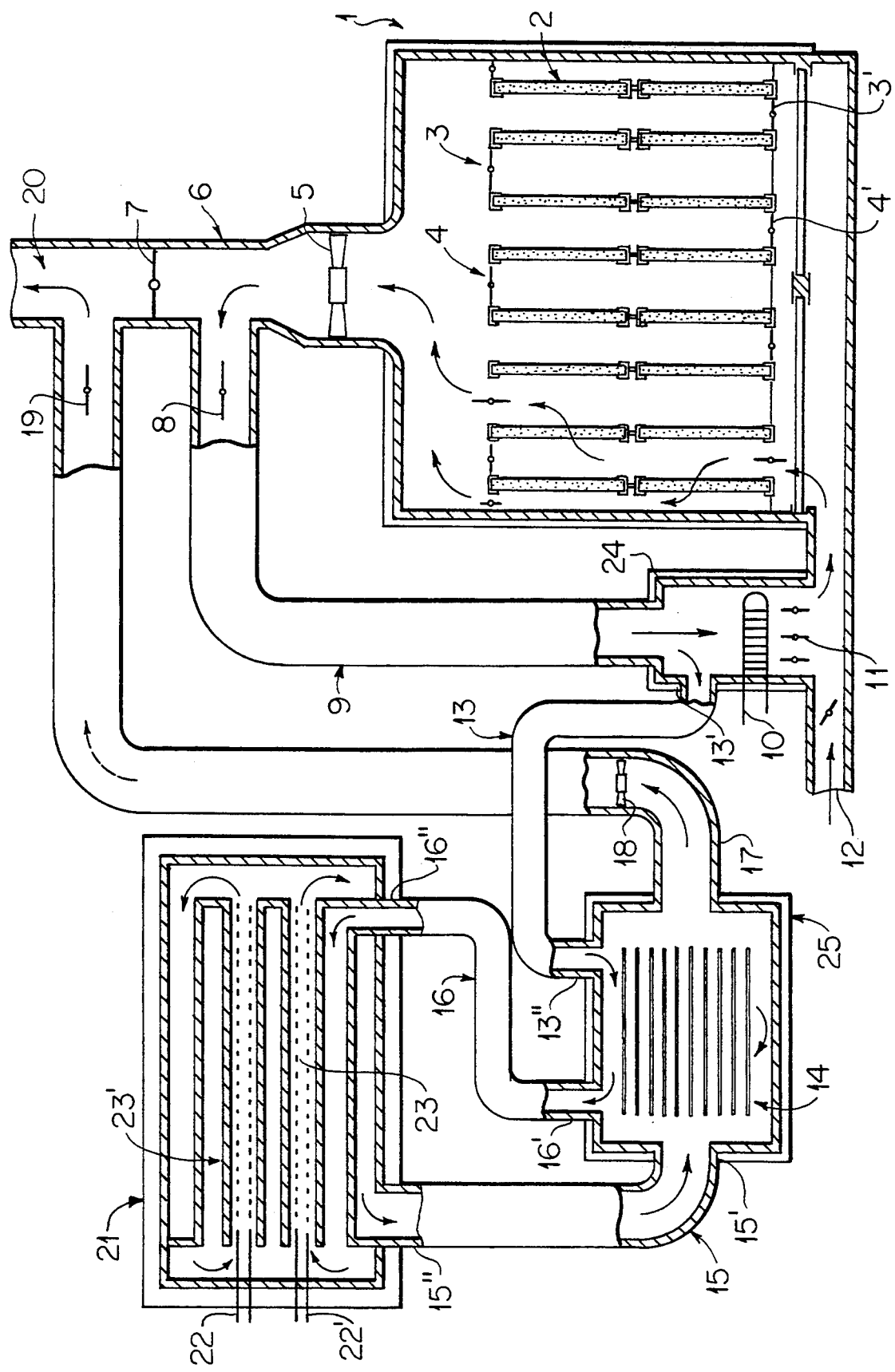

PROCESS FOR DESTROYING SUSPENDED PARTICLES

This application is a continuation of U.S. patent application Ser. No. 08/103,707, filed Aug. 10, 1993 now abandoned.

FIELD OF THE INVENTION

The present invention relates to industry in general and also to automobile repairs. When a spray booth is used for spray-painting, a process for removing the solvents contained in the air moving in the booth, before their discharge to the environment, is expressly of advantage.

BACKGROUND OF THE INVENTION

In effect, the air extracted from a spray booth contains, in suspension, two types of products which are in fact the constituents of the paint, lacquer or varnish:
- solid compounds or pigments,
- volatile compounds or solvents representing 40% by weight of the product to be applied.

Public authorities currently impose draconian standards on the amounts of air flowing through spray booths, both by extraction and intake; the situation is likewise for noise pollution.

It is common to encounter plants with flow rates of 20,000 $m^3/h$ to 25,000 $m^3/h$; these flow rates which accrue over more than 20,000 registered plants carry overall 5000 tons of solvents annually.

Systems are known which are based on a simple trap containing active charcoal and on a single compact barrier, these systems only remaining functional if the volume of paint deposited corresponds only to a daily concentration which can be assimilated by this simple barrier.

In current plants, the majority of the solid compounds are trapped in dry or moist filters, whereas the volatile compounds are stored in active charcoal filters which have to be regenerated; nevertheless, the storage and regeneration process has the aim only of converting the heterogeneous discharges to homogeneous discharges in order to avoid the time of emissions of pollution peaks during the spraying stage, of storing the latter at 90% and of dispatching it to atmosphere at any time at a very low concentration (homogeneous discharges below the smell threshold and the threshold of toxicity risks for the neighborhood).

However, it is clear that the pollutions are quantitatively the same.

BRIEF DESCRIPTION OF THE INVENTION

The present invention thus proposes to improve the storage and regeneration stages by preventing any discharge of volatile particles, even greatly diluted, into the environment, by the addition of a process for the destruction by pyrolysis of the gases before their discharge; additionally, it makes possible complete and homogeneous oxidation of the solvents during desorption without fear of by-products which are often more dangerous than the original substances.

The subject of the invention is thus a process for destroying gas, such as especially air, containing solvents and volatile compounds, by pyrolysis, characterized in that the contaminated air, corresponding to the dilution air necessary for regenerating active charcoal filter boxes, is subjected to a multi-stage treatment:

a first gas flow containing the suspended compounds to be destroyed is channelled into a preheating unit;
it is intimately mixed with a second uncontaminated gas flow constituting an external contribution;
these two flows are combined and are recycled into a solvent captor in order to improve the yield of the desorption reaction;
this flow, containing all the suspended components, is then subjected to a further preheating, which is more intense than the previous one, so that the pyrolytic oxidation reaction is complete;
the gas flow, devoid of noxious particles, is cooled before being discharged to the environment.

Other characteristics and advantages of the present invention will emerge from the description given below, with reference to the appended drawing which illustrates an implementation example of the use of the process thereof which is free of any limiting nature. In the single figure;

BRIEF DESCRIPTION OF THE FIGURES

The FIGURE is a top sectional view of the plant for capturing and destroying solvents during regeneration.

DETAILED DESCRIPTION OF THE INVENTION

According to a preferred embodiment of this process for destroying suspended particles by pyrolytic combustion (refer to the figure), the air is extracted from a spray booth (not shown), it passes into a pipe 12 and passes through a box 1 containing a plurality of active charcoal filters 2. These filters or solvent captors form a series of enclosures isolated from each other at each of their ends by a plurality of registers 3, 4, 3', 4'.

The extracted gas flow corresponds to a dilution flow necessary for the regeneration of the active charcoal filter boxes; in effect, it is essential for the high yield of the degree of absorption of these active charcoals to periodically carry out desorption of the solvent contents. The dilution air circulates through these filters during the halt in the emission of solvents.

By modifying the opening and the closing of the said registers, the desorption operation of the active charcoal filters, and subsequently the pyrolytic destruction, can thus take place cyclically on each of the said enclosures present in the said main box.

An extraction fan 5 sucks the air through the said enclosures, a flap 7 situated in the chimney 6 obstructs it, it directs the circulating air towards a bypass 9, optionally isolated from the main box by a register 8, connected to a preheating unit 24.

This chamber is equipped with an external heat source 10, preferentially a heating resistance using electrical power installed in the spray booth. This enclosure comprises flaps 11 in its bottom part which make possible a contribution from external air via the pipe 12. A closed-circuit circulation through pipes and components 9, 12 and 1 is established and leads to the progressive reheating of the circulating air, thus promoting the advent of an optimum temperature for the total desorption of the solvent captors.

A pipe 13, known as the extraction pipe, emerges at one of its ends 13' in the preheating enclosure 24 and at the other, 13", in a heat exchanger 25, preferentially of the crosswise type.

The air containing the volatile particles, and optionally the solid particles, is heated to a temperature, known as the preheating temperature, of the order of 320° C. in contact with a secondary flow emanating from a pipe 15 in communication, at 15' and 15", with the exchanger 25 and with the pyrolytic oven 21.

In effect, there prevails, in the pyrolytic oven, a very high temperature of the order of 750° C., synonymous with a possible energy recovery in the enclosure 25 which communicates with the said oven via the pipes 15 and 16. The said crosswise exchanger 25 comprises a multitude of otherwise known devices 14 forming baffles and making it possible to increase considerably the exchange surface area between the two circulating flows.

The primary flow containing the particles to be oxidized is withdrawn at the level of 16' on the cross-wise exchanger 25 via a pipe 16, this flow circulates at 16" inside the pyrolytic oven 21, in contact with the pyrolytic chambers 23 and 23', complete oxidation of the suspended particles takes place, the solvents decompose to simple components and there is no recombination to by-products which are possibly more dangerous than the initial materials.

The said pyrolytic chambers comprise at least one heating pin 22 connected to the electrical network present in the spray booth, the passage of the current leads to heating of the contact surfaces of the said chambers and to the appearance of a very high temperature which initiates the pyrolytic reaction.

In permanent operation, a fan 18 placed in a pipeline 17, extracts the air containing the simple components from the preheating enclosure 25; a flap 19 inside 17 puts the gas flow in communication with the extraction chimney 20.

The plant assembly and especially the preheating enclosures 25 and 24, as well as the pyrolytic oven 21, are thermally insulated.

The pyrolysis process considerably reduces the size of the existing plants, and the sizes of the extraction and the intake columns are reduced, which makes it possible to advantageously envisage their use in urban situations.

The procedure is entirely managed by a programmable automaton which controls, among others, the opening or the closing of all the flaps present in the plant, and it thus determines cyclic desorption and pyrolytic destruction operations around each of the charcoal filters. It is clear that the process, which is the subject of the invention, cannot be dissociated from the process for capturing and regenerating solvents; it is an essential complement for achieving the objectives set.

The reading of the preceding description shows that the invention introduces a novelty into the treatment and removal of solvents emerging from a spray booth or from any other confinement system which makes it possible, at the same time, to suppress heterogeneous discharges to homogeneous discharges, the destruction of these discharges takes place during the period of non-use of the booth, generally night time in order not to interfere with the operation of the latter, when the energy, and especially electricity, costs are the lowest, and these plants also allow, in the case of significant daily absorption, the regeneration discharges to be sequenced in order to avoid excessively large outputs in pyrolysis and in preheating.

Of course, it remains that the present invention is not limited to the implementation examples described and represented above, but that it encompasses all the variants thereof.

I claim:

1. A method for regenerating an activated charcoal filter for a spray paint booth exhaust, the method comprising the steps:

passing a first gas flow of inlet air through the filter;
   preheating the first gas flow;
   combining the preheated first gas flow with additional air to form a preheated second gas flow;
   recirculating the preheated second gas flow through the filter for desorbing filtered contaminants into the second gas flow;
   diverting a portion of the second gas flow to a heat contributing heat exchanging point for further heating;
   pyrolytically oxidizing the further reheated gas flow, thereby oxidizing substantially all of the suspended particles therein;
   passing the resulting oxidized flow, at elevated temperature, to the heat exchanging point for cooling the oxidized gas flow and contributing exchanged heat to the second gas flow to achieve heating of second gas flow entering the heat exchanging point; and
   discharging the cooled flow, devoid of noxious particles, to the atmosphere.

2. The regenerating method set forth in claim 1 further comprising the step of providing a common electrical source for the preheating of the first gas flow, the pyrolytic oxidation elevated temperature, and power required for spray painting 3. The regenerating method set forth in claim 1 wherein the heat exchanging is performed across a baffle path to increase the heat exchanging surface.

4. The regenerating method set forth in claim 1 wherein the method is performed along a thermally insulated path.

5. The regenerating method set forth in claim 1 wherein the preheated second gas is at a temperature of 320° C. for achieving substantially complete desorption of the activated charcoal filter.

* * * * *